(12) United States Patent
Abdul et al.

(10) Patent No.: US 12,352,315 B2
(45) Date of Patent: Jul. 8, 2025

(54) SERVICEABLE BEARING ASSEMBLY

(71) Applicant: Aktiebolaget SKF, Gothenburg (SE)

(72) Inventors: Azeez Abdul, Utrecht (NL); Hendrik Anne Mol, ED Varik (NL); Lieuwe De Vries, Zeist (NL)

(73) Assignee: Aktiebolaget SKF, Gothenburg (SE)

( * ) Notice: Subject to any disclaimer, the term of this patent is extended or adjusted under 35 U.S.C. 154(b) by 381 days.

(21) Appl. No.: 18/096,499

(22) Filed: Jan. 12, 2023

(65) Prior Publication Data
US 2023/0231435 A1    Jul. 20, 2023

(30) Foreign Application Priority Data

Jan. 17, 2022 (DE) .......................... 102022200444.2

(51) Int. Cl.
| | |
|---|---|
| *F16C 35/06* | (2006.01) |
| *F16C 19/06* | (2006.01) |
| *H02K 5/173* | (2006.01) |

(52) U.S. Cl.
CPC .............. *F16C 35/06* (2013.01); *F16C 19/06* (2013.01); *H02K 5/1732* (2013.01); *F16C 2380/26* (2013.01)

(58) Field of Classification Search
CPC ...... H02K 5/1732; H02K 15/00; F16C 19/06; F16C 35/06; F16C 2380/26; F16C 25/083; F16C 35/063; F16C 39/00
See application file for complete search history.

(56) References Cited

FOREIGN PATENT DOCUMENTS

| CN | 1714492 A | * | 12/2005 | .............. F16C 19/54 |
| CN | 201563020 U | | 8/2010 | |
| WO | WO-2008074296 A2 | * | 6/2008 | ............ F16C 19/182 |
| WO | 2017214239 A1 | | 12/2017 | |

* cited by examiner

*Primary Examiner* — Mohamad A Musleh
(74) *Attorney, Agent, or Firm* — GARCIA-ZAMOR INTELLECTUAL PROPERTY LAW, LLC; Ruy Garcia-Zamor

(57) ABSTRACT

A rolling assembly having a rolling bearing provided with a first ring and with a second ring capable of rotating concentrically relative to one another, and with a plurality of rolling elements disposed between the first and second rings. The assembly further includes a bearing mounting and dismounting device having a supporting shaft to which the first ring of the rolling bearing is mounted, and a sleeve slidably mounted on the supporting shaft between a remote position from the rolling bearing and a close position in which the sleeve is in axial contact with the second ring of the rolling bearing.

10 Claims, 2 Drawing Sheets

SERVICEABLE BEARING ASSEMBLY

CROSS-REFERENCE TO RELATED APPLICATIONS

This application claims priority to German Patent Application no. 102022200444.2, filed Jan. 17, 2022, the contents of which is fully incorporated herein by reference.

TECHNICAL FIELD

The present invention generally relates to rolling bearings for electric motor. More precisely, the invention concerns a bearing assembly comprising a serviceable rolling bearing.

BACKGROUND OF THE INVENTION

It is common to use variable frequency drives (VFDs) for the electrical motor control.

Usually, VDFs are located at an output stage connected to the stator or other windings of the electric motor and comprise insulated gate bi-polar transistors (IGBTs) and/or metal-oxide-semiconductor field-effect transistors (MOSFETs), which are being switched in a rather fast manner and comprise steep switching flanks.

The fast switching of the IGBTs used in VFDs can cause high frequency grounding currents which are generated in the rotor, flowing through the rotor and the bearings, and are driven by common mode voltages through coupling capacitances from stator to rotor and stator-core to stator-iron respectively.

Typically, in an electrical motor, a rolling bearing is mounted between a motor casing and a rotating shaft to support the shaft, and the generation of such electrical currents flowing through the bearing have a significant influence on its premature failure.

Lubricant such as, for example, hydrodynamic films are generally provided inside the rolling bearing, so that it separates the rolling elements from the raceways of the inner and outer rings, in order to resist the flow of electrical current. This leads to a potential difference across the rolling bearing so that a bearing with contacts fully separated by the lubricant behaves as an additional capacitor resisting the flow of current to the ground.

However, after a certain voltage limit is reached, the lubricating oil films suffer from electric breakdown leading to a discharge event inside the bearing.

The electrical current discharges cause microscopic surface damage, increasing the surface roughness of the rolling elements and the inner ring and outer ring raceways of the rolling bearing.

The number of discharge events and energy behind each discharge determines the number of surface pits and microcraters, and the size and depth of each micro-crater respectively. Over time, this surface damage develops into grey-frosting, and in certain cases into fluting also known as washboarding. Due to the increased roughness on the grey-frosted zone, the rolling elements lock themselves onto the track.

As a result, noise and vibration of the rolling bearing increases and its life service decreases.

An existing solution is to ground high frequency discharge currents flowing through the rotor shaft of the electrical motor using a grounding brush with conductive fibers.

However, despite the presence of such conductive brushes, damage can still be observed on the rolling bearing raceways after a short period of use.

Besides, the presence of any oil or dirt in their operating environment makes them ineffective by creating additional resistance between the grounding brush and the rotor shaft.

Another solution consists in using a sacrificial bearing intended to be connected to the ground in order to protect the main bearings electrically insulated and supporting the rotor shaft.

The sacrificial bearing, then subject to electrical discharges, requires regular maintenance or even occasional replacement.

However, the dismounting of the bearing is complex and may require to disassemble the rotor from the stator.

Consequently, the present invention intends to overcome these disadvantages by providing a simple and low cost rolling bearing assembly easily removable for maintenance or replacement.

SUMMARY OF THE INVENTION

The invention relates to a rolling bearing assembly comprising a rolling bearing provided with a first ring and with a second ring capable of rotating concentrically relative to one another, and with a plurality of rolling elements disposed between the first and second rings.

Besides, the bearing assembly further comprises a bearing mounting and dismounting device comprising a supporting shaft to which the first ring of the rolling bearing is mounted and a sleeve slidably mounted on the supporting shaft between a remote position from the rolling bearing and a close position in which the sleeve is in axial contact with the second ring of the rolling bearing.

The bearing mounting and dismounting device allows to easily remove the rolling bearing in one go for maintenance or replacement. Reassembling is also made easier by pushing the rolling bearing without loading the rolling elements.

This improves the serviceability of the electric motor by having a bearing assembly with a rolling bearing that can be easily replaced in regular service intervals with little effort and little service cost.

Preferably, the bearing mounting and dismounting device further comprises an axial preload element axially disposed between the supporting shaft and the sleeve to exert a permanent axial force therebetween in order to ensure an efficient contact between the rolling elements and the first and second rings.

Advantageously, the sleeve may be provided at one end with a cover protecting from the outside said end of the supporting shaft, the axial preload element being axially disposed between the supporting shaft and the cover of the sleeve.

Advantageously, the sleeve may comprise at least one radial protrusion slidably engaged into a slot of the supporting shaft. So as to easily connect the supporting shaft and the sleeve while preventing forced rotation due to friction in the rolling bearing, as well as aligning the axial preload with the center of the rolling bearing.

Preferably, the bearing assembly further comprises an elastic member mounted on the second ring of the rolling bearing and radially projecting with respect to a cylindrical surface of the second ring radially opposite to the rolling elements.

According to an embodiment, the elastic member can have a non-cylindrical shape and be provided with portions in contact with the cylindrical surface of the second ring radially opposite to the rolling elements, and with portions radially spaced away from said cylindrical surface of the second ring.

The elastic member guarantees a sufficient strong fit to keep the rolling bearing in place onto or into the rotor shaft on which the bearing assembly can be mounted, while ensuring thermal expansion and a tolerance between the diameter of the rolling bearing and the diameter of the rotor shaft.

Advantageously, the bearing mounting and dismounting device can be made of electrically conductive material. The rolling bearing of the bearing assembly can then be used as a grounding rolling bearing for an electric motor in order to protect main rolling bearings supporting the rotor shaft.

According to an embodiment, the bearing mounting and dismounting device further comprises a conductive wire connecting the supporting shaft to the ground.

Alternatively, in order to avoid possible electrical resistance between the inner ring and the supporting shaft, the bearing mounting and dismounting device can comprise a conductive wire connecting the first ring of the rolling bearing to the ground.

The invention also concerns an electric motor comprising a stator having stator windings, a rotor having a hollow rotor shaft and rotor windings, wherein the electrical motor comprises at least one bearing assembly as previously described, the rolling bearing of the bearing assembly being mounted into the bore of the rotor.

The invention further concerns an electrical motor comprising a stator having stator windings, a rotor having a rotor shaft and rotor windings, wherein the electrical motor comprises at least one bearing assembly as previously described, the rolling bearing of the mounted assembly being mounted onto the outer surface of the rotor shaft.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiment of the invention, which are non-limiting example, illustrated on the appended drawing of which.

DETAILED DESCRIPTION OF THE INVENTION

Figure 1:
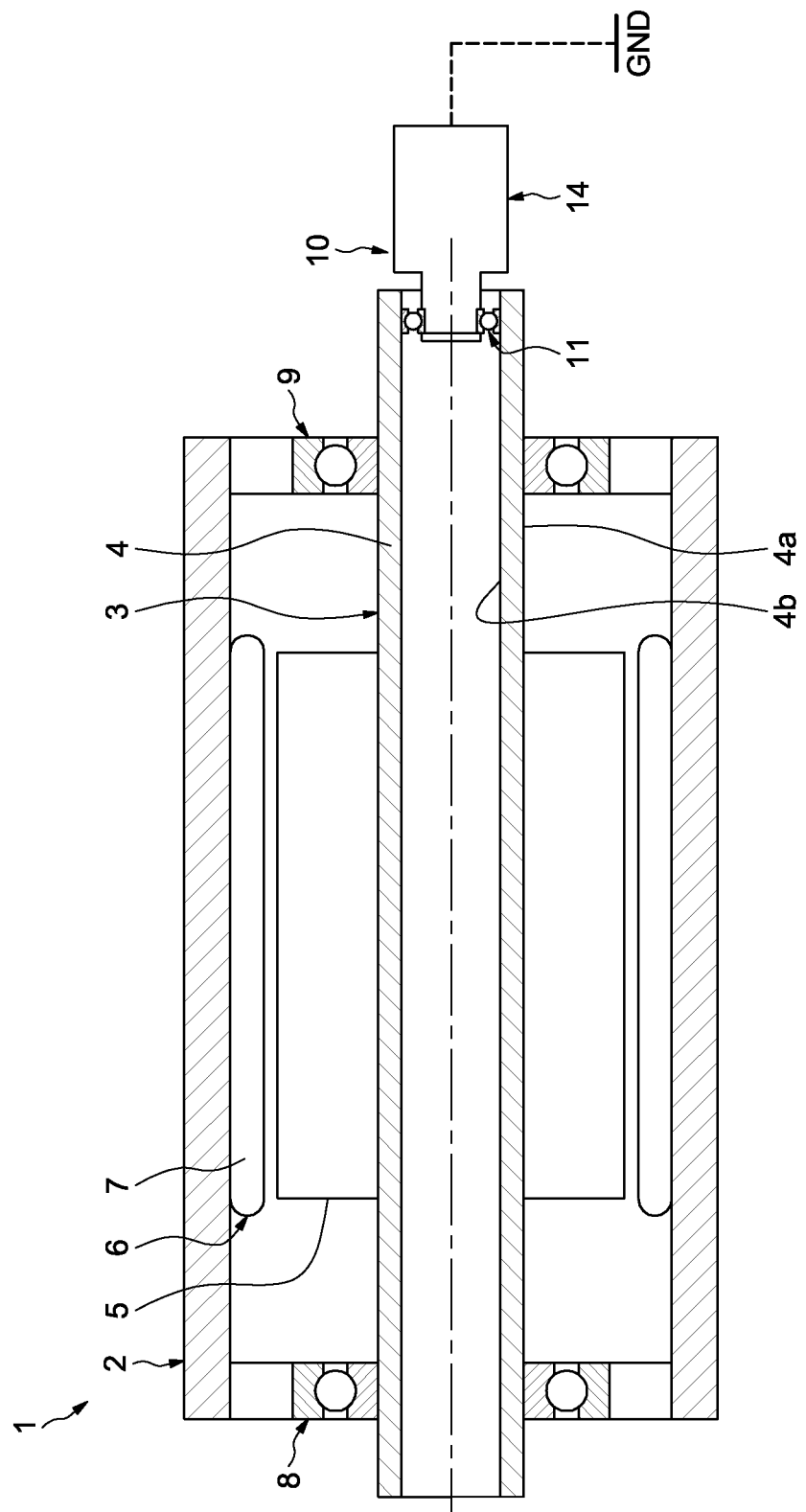
FIG. 1 is an axial cross-sectional view of an electric motor comprising a bearing assembly according to an example of the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows a schematic view of an electric motor 1, which in the illustrated example is an electric motor of a propulsion system for an automotive vehicle.

The electric motor 1 comprises a casing 2, a rotor 3 having a shaft 4 and rotor windings 5, and a stator 6 having stator windings 7.

The illustrated rotor shaft is a hollow shaft having an outer surface 4a and a bore 4b.

The electric motor 1 further comprises two main bearings 8, 9 to support the rotor 3. Advantageously, the two main bearings 8, 9 may be radially mounted between the rotor shaft 4 and the casing 2, on both sides of the rotor windings 5.

In the illustrated example, the two main bearings 8, 9 are rolling bearings and are identical.

In alternative embodiments, the electric motor 1 can comprise only one main bearing, or more than two main bearings.

Figure 2:
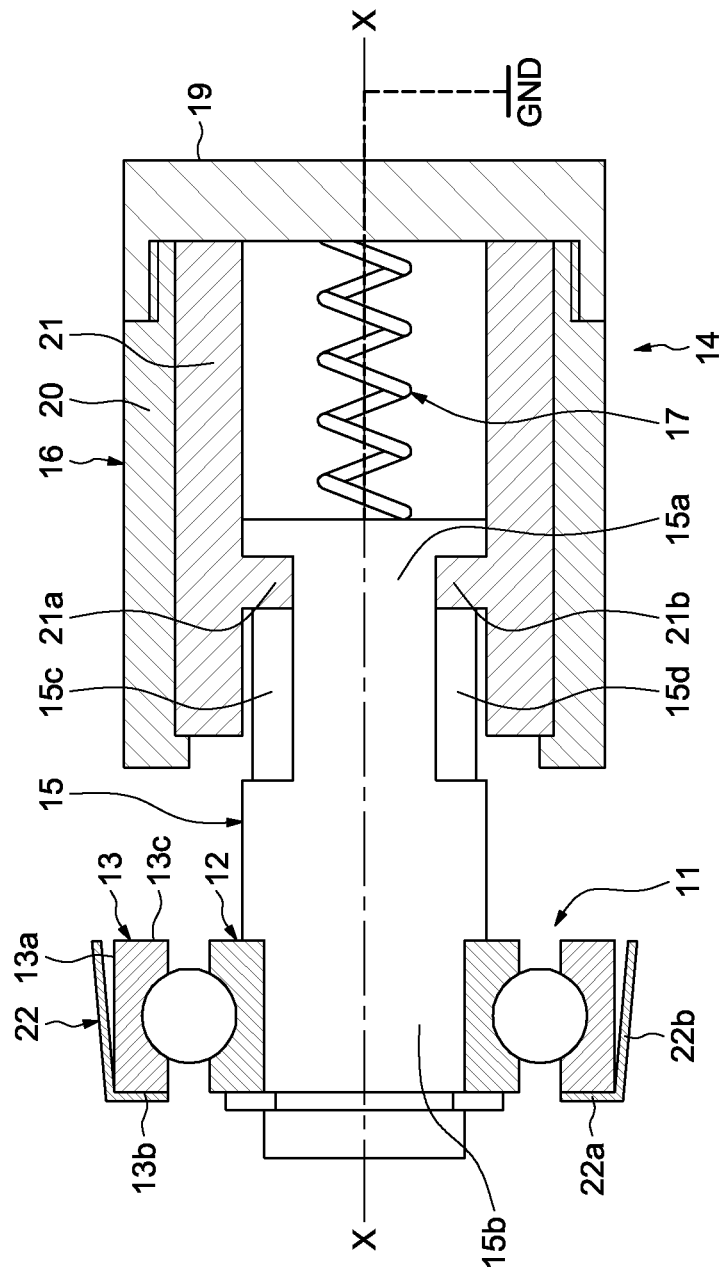
FIG. 2 is an axial cross-sectional view of the bearing assembly illustrated in FIG. 1.

The electric motor 1 also includes a bearing assembly 10, a detailed view of which being illustrated in FIG. 2.

The bearing assembly 10 comprises a rolling bearing 11 provided with a first ring 12 and a second ring 13. In the illustrated example, the first ring 12 is the inner ring whereas the second ring 13 is the outer ring.

As shown in FIG. 1, the rolling bearing is mounted into the bore 4b of the rotor shaft 4.

Referring once again to FIG. 2, the inner and outer rings 12, 13 are concentric and extend axially along the rolling bearing rotation axis X-X which runs in an axial direction. The outer ring 13 radially surrounds the inner ring 12.

The outer ring 13 is provided with an outer cylindrical surface 13a and with a cylindrical inner surface or bore (not referenced) which is radially opposite to the outer surface. The outer ring 13 is also provided with two opposite radial lateral faces 13b, 13c which axially delimit the bore and the outer surface 13a of said ring.

The rolling bearing 11 further comprises a plurality of rolling elements (not referenced) disposed between the inner and outer rings 12, 13. Here, the rolling elements are radially disposed between the inner and outer rings 12, 13.

In the illustrated example, the illustrated rolling elements are balls. Alternatively, the rolling bearing 11 may comprise other types of rolling elements, such as cylindrical or conical rollers, needles, etc.

Besides, the bearing assembly 10 further comprises a bearing mounting and dismounting device 14 allowing to disassemble and reassemble the rolling bearing 11 with the electric motor.

The bearing mounting and dismounting device 14 includes a supporting shaft 15 onto which the inner ring 12 of the rolling bearing is mounted, and a sleeve 16 radially surrounding at least a first end 15a of the supporting shaft 15. The inner ring 12 of the rolling bearing is mounted on a second end 15b of the supporting shaft axially opposite to the first end 15a.

The sleeve 16 is slidably mounted on the supporting shaft 15a between a remote position from the rolling bearing, illustrated in FIG. 2, and a close position from the rolling bearing in which the sleeve is in axial contact with the outer ring 13 of the rolling bearing 11.

Such a bearing mounting and dismounting device 14 improves the serviceability of the rolling bearing 11.

In particular, dismounting the rolling bearing 11 can be easily done without having to disassemble the electric propulsion system of the automotive vehicle, or having to dismount the rotor 3 from the stator 6.

The bearing mounting and dismounting device 14 further comprises an axial preload element 17 axially disposed between the supporting shaft 15 and the sleeve 16 to exert a permanent axial force therebetween.

Preferably, the axial preload element is configured to apply a load between 0.1 N to 100 N.

For example, the axial preload element 17 may comprise a spring extending along the rolling bearing rotation axis X-X. The spring has a first end mounted on the sleeve 16 and a second end opposite the first end and in contact with the end 15a of the supporting shaft 15.

The spring may be a coil spring or other appropriate type of spring. As previously indicated, in this example, the axial preload element 17 comprise the spring. Alternatively, the axial preload element 17 may comprise other type of elastic elements, such as washers, for example Belleville washers.

In the illustrated example, the sleeve 16 is provided at one end with a cover 19 protecting the end 15a of the supporting shaft 15 from the outside.

For example, the cover 19 and the sleeve 16 can be provided with complementary threads for being screwed one another. Alternatively, the sleeve 16 may be made into one part.

The axial preload element 17 is axially disposed between the supporting shaft 15 and the cover 19 of the sleeve 16.

In the illustrated example, the sleeve 16 comprises an outer tube 20 and an inner bushing 21. The tube 20 and the bushing 21 are concentric and arranged radially one against the other so that the inner surface of the tube 20 is in contact with the outer surface of the bushing 21.

The free end of the tube 20 facing the rolling element 11 comprises a rib (not referenced) that radially extends inwards in order to axially retain the bushing 21.

The cover 19 is attached to the tube 20 of the sleeve 16.

Alternatively, the tube 20 and the bushing 21 can be made in one part.

The sleeve 16 comprises radial protrusions 21a projecting inwards and slidably engaged in two respective slots 15c and 15d formed on the outer surface of the supporting shaft 15 providing anti-rotation feature between the sleeve 16 and the supporting shaft 15. This prevents forced rotation due to friction in the rolling bearing 11. In the illustrated example, the protrusions are provided on the bushing 21. In the illustrated example, the sleeve 16 comprises two radial protrusions. Alternatively, the sleeve 16 may comprise only one protrusion ore more than two protrusions.

The bushing 21 aligns the spring 17 with the center of the rolling bearing 11, so that it can easily slide parallel to the rotational axis of the rotor shaft 4.

According to an embodiment, the bearing assembly 10 further comprises a housing or housing cap in contact with the cover 19 in order that the sleeve 16 can be kept in place. In use, the housing or housing cap contribute to maintain the bearing mounting and dismounting device 14 in place into the rotor shaft 4 so that the sleeve 16 can exert a permanent axial force against the lateral face 13c of the outer ring 13.

Furthermore, an elastic member 22 can be advantageously mounted on the outer ring 13 of the rolling bearing 11.

The elastic member 22 radially projects with respect to the outer surface 13a of the outer ring 13.

In the illustrated example, the elastic member 22 is provided with an annular attaching portion 22a in contact with the lateral face 13b of the outer ring, and with a preload portion 22b connected to the annular attaching portion 22a and radially projecting with respect the outer surface 13a of the outer ring, so that the annular elastic member 22 may provide a uniform radial preload to the outer ring 13 of the rolling bearing 11.

The preload portion 22b can comprise a plurality of radially projecting tabs.

The elastic member 22 guarantees a sufficient strong fit to keep the rolling bearing 11 in place into the rotor shaft 4 on which the bearing assembly 10 is mounted.

The elastic member 22 also allows the thermal expansion of the rolling bearing 11 and the rotor shaft 4, as well as a certain tolerance between the diameter of the rolling bearing 11 and the inner diameter of the rotor shaft 4.

Alternatively, the elastic member may have a non-cylindrical shape, and be provided with portions in contact with the cylindrical surface 13a of the outer ring 13, and with portions radially spaced away from said cylindrical surface 13a.

For example, the non-cylindrical elastic member may have an oval shape providing two or three portions in contact with the outer ring 13 of the rolling bearing 11.

In the illustrated example, the rolling bearing 11 is a grounding rolling bearing whose function is to protect the main bearings 8, 9 of the electric motor 1, allowing the current passage to the ground and subjected to electrical discharges while the two main bearings 8, 9 are advantageously electrically insulated.

In this respect, the bearing mounting and dismounting device 14 and the elastic member 22 can be made of electrically conductive material.

The rolling bearing 11 can then effectively ground the high frequency capacitively coupled common mode currents in order to extend the service life of the main bearings 8,9 and can be easily repaired or replaced when necessary to eliminate noise and vibration from the rolling bearing 11.

In an embodiment, the bearing mounting and dismounting device 14 further comprises a conductive wire connecting the supporting shaft 15 to the ground.

In another embodiment, the conductive wire connects the inner ring 12 of the rolling bearing 11 to the ground. For example, the conductive wire can be point welded to the inner ring 12.

For mounting the bearing assembly 10 into the rotor shaft 4, firstly, the rolling bearing 11 is slightly introduced into the bore 4b of the rotor shaft 4. Then, when the outer ring 13 of the rolling is in contact with the bore of the rotor shaft 4, the sleeve 16 is axially pushed to slide along the supporting shaft 15 from the remote position away from the rolling bearing 11 to the close position in which the sleeve 16 is in axial contact with the lateral face 13c of the outer ring of the rolling bearing 11.

The sleeve 16 exerts a pushing force against the lateral face 13c of the outer ring 13 without pushing on the inner ring 12 and causing mounting damage.

When the rolling bearing 11 is correctly mounted, and that we stop pushing the bearing assembly 10, the sleeve 16 returns in the remote position away from the rolling bearing 11 by sliding along the supporting shaft 15, driven by the return force of the axial preload element 17.

The elastic member 22 mounted between the bore 4a of the rotor shaft 4 and the outer ring 13 of the rolling bearing 11 efficiently retains the rolling bearing 11 in place.

During operation of the electric motor 1, the axial preload element 17 exerts a constant load on the inner ring 12 of the rolling bearing 11.

When the rolling bearing 11 needs to be repaired or replaced, the bearing assembly 10 can be dismounted in one go from the rotor shaft 4 by pulling on the bearing mounting and dismounting device 14, which pulls the rolling element 11 out of the bore 4b of the rotor shaft 4.

As previously indicated in the illustrated example, the rolling bearing 11 of the bearing assembly 10 is mounted into the bore 4b of the rotor shaft 4.

According to an alternative embodiment, the rolling bearing 11 of the bearing assembly 10 can be mounted onto the outer surface 4a of the rotor shaft 4.

In this case, the inner ring of the rolling bearing is mounted on the outer surface 4a of the rotor shaft 4 and forms the second ring of the rolling bearing and the outer ring forms the first ring.

Besides, the supporting shaft 15 of the bearing assembly 10 is replaced by a hollow tube into which the outer ring is mounted, the sleeve being slidably mounted on said hollow tube in order to be able to come axially into contact with the lateral of the inner ring. In this reversed example, the sleeve is mounted into the hollow shaft 15 and the axial preload element exerts a permanent axial force on the outer ring 13.

The invention claimed is:

1. A bearing assembly comprising:
   a rolling bearing provided with a first ring and with a second ring capable of rotating concentrically relative to one another, and with a plurality of rolling elements disposed between the first and second rings,
   a bearing mounting and dismounting device comprising a supporting shaft to which the first ring of the rolling bearing is mounted, and a sleeve slidably mounted on the supporting shaft between a remote position from the rolling bearing and a close position in which the sleeve is in axial contact with the second ring of the rolling bearing.

2. The bearing assembly according to claim 1, wherein the bearing mounting and dismounting device further comprises an axial preload element axially disposed between the supporting shaft and the sleeve to exert a permanent axial force therebetween.

3. The bearing assembly according to claim 2, wherein the sleeve is provided at one end with a cover protecting from the outside said end of the supporting shaft, the axial preload element being axially disposed between the supporting shaft and the cover of the sleeve.

4. The bearing assembly according to claim 1, wherein the sleeve comprises at least one radial protrusion slidably engaged into a slot of the supporting shaft.

5. The bearing assembly according to claim 1, further comprises an elastic member mounted on the second ring of the rolling bearing and radially projecting with respect to a cylindrical surface of the second ring radially opposite to the rolling elements.

6. The bearing assembly according to claim 5, wherein the elastic member has a non-cylindrical shape and is provided with portions in contact with the cylindrical surface of the second ring radially opposite to the rolling elements, and with portions radially spaced away from said cylindrical surface of the second ring.

7. The bearing assembly according to claim 1, wherein the bearing mounting and dismounting device is made of electrically conductive material.

8. The bearing assembly according to claim 1, wherein the bearing mounting and dismounting device further comprises a conductive wire connecting the supporting shaft, or the first ring of the rolling bearing, to the ground.

9. An electrical motor comprising:
   a stator having stator windings,
   a rotor having a hollow rotor shaft and rotor windings, wherein
   at least one bearing assembly having a rolling bearing provided with a first ring and with a second ring capable of rotating concentrically relative to one another, and with a plurality of rolling elements disposed between the first and second rings,
   a bearing mounting and dismounting device comprising a supporting shaft to which the first ring of the rolling bearing is mounted, and a sleeve slidably mounted on the supporting shaft between a remote position from the rolling bearing and a close position in which the sleeve is in axial contact with the second ring of the rolling bearing, the rolling bearing of the bearing assembly being mounted into the bore of the rotor.

10. An electrical motor comprising:
    a stator having stator windings,
    a rotor having a rotor shaft and rotor windings, and
    at least one bearing assembly having a rolling bearing provided with a first ring and with a second ring capable of rotating concentrically relative to one another, and with a plurality of rolling elements disposed between the first and second rings,
    a bearing mounting and dismounting device comprising a supporting shaft to which the first ring of the rolling bearing is mounted, and a sleeve slidably mounted on the supporting shaft between a remote position from the rolling bearing and a close position in which the sleeve is in axial contact with the second ring of the rolling bearing, wherein
    the rolling bearing of the bearing assembly being mounted onto the outer surface of the rotor shaft.

* * * * *